(12) United States Patent
Van Helmond et al.

(10) Patent No.: US 10,385,221 B2
(45) Date of Patent: Aug. 20, 2019

(54) ERODIBLE ANTIFOULING COATING COMPOSITION

(71) Applicant: PPG Coatings Europe B.V., Amsterdam (NL)

(72) Inventors: Joanna Blaszczyk Van Helmond, Santpoort Zuid (NL); Jiska Massink, Nieuwkoop (NL); Sijmen Johan Visser, Marken (NL)

(73) Assignee: PPG Coatings Europe B.V., Amsterdam (NL)

( * ) Notice: Subject to any disclaimer, the term of this patent is extended or adjusted under 35 U.S.C. 154(b) by 76 days.

(21) Appl. No.: 15/301,446

(22) PCT Filed: Mar. 27, 2015

(86) PCT No.: PCT/EP2015/056685
§ 371 (c)(1),
(2) Date: Oct. 3, 2016

(87) PCT Pub. No.: WO2015/150249
PCT Pub. Date: Oct. 8, 2015

(65) Prior Publication Data
US 2017/0022373 A1    Jan. 26, 2017

(30) Foreign Application Priority Data
Apr. 3, 2014  (EP) ..................... 14163448

(51) Int. Cl.
| | | |
|---|---|---|
| C09D 5/16 | (2006.01) | |
| C09D 143/04 | (2006.01) | |
| C09D 201/10 | (2006.01) | |
| B05D 3/00 | (2006.01) | |
| C09D 5/00 | (2006.01) | |
| C09D 5/14 | (2006.01) | |
| C09D 133/14 | (2006.01) | |
| C09D 193/04 | (2006.01) | |

(52) U.S. Cl.
CPC ........... *C09D 5/1687* (2013.01); *B05D 3/007* (2013.01); *C09D 5/008* (2013.01); *C09D 5/14* (2013.01); *C09D 5/165* (2013.01); *C09D 5/1662* (2013.01); *C09D 5/1675* (2013.01); *C09D 5/1681* (2013.01); *C09D 133/14* (2013.01); *C09D 143/04* (2013.01); *C09D 193/04* (2013.01); *C09D 201/10* (2013.01)

(58) Field of Classification Search
CPC .................................. C09D 5/16; C09D 5/1675
See application file for complete search history.

(56) References Cited

U.S. PATENT DOCUMENTS

| | | | |
|---|---|---|---|
| 4,021,392 A | | 5/1977 | Milne et al. |
| 4,025,693 A * | | 5/1977 | Milne ................... C09D 5/1675 |
| | | | 428/447 |
| 4,426,464 A * | | 1/1984 | Sghibartz ............... C09D 5/165 |
| | | | 106/15.05 |
| 4,883,852 A * | | 11/1989 | Masuoka .............. C09D 5/1668 |
| | | | 526/279 |
| 5,663,215 A | | 9/1997 | Milligan |
| 5,904,988 A | | 5/1999 | Stein et al. |
| 6,126,991 A | | 10/2000 | Stein |
| 7,977,407 B1 | | 7/2011 | Mori et al. |
| 8,574,719 B2 | | 11/2013 | Davies et al. |
| 2010/0003211 A1 * | | 1/2010 | Sakamoto ............. C09D 5/1637 |
| | | | 424/78.09 |
| 2011/0287268 A1 * | | 11/2011 | Blanc ................... B01J 31/0237 |
| | | | 428/447 |

FOREIGN PATENT DOCUMENTS

| | | |
|---|---|---|
| CN | 101260262 | 2/2011 |
| CN | 102533106 A | 7/2012 |
| CN | 102337063 | 10/2013 |
| EP | 0489998 | 6/1992 |
| EP | 1045012 | 10/2000 |
| EP | 1 092 758 A2 | 4/2001 |
| GB | 2 188 938 A | 10/1987 |
| JP | S62283167 | 12/1987 |
| JP | H08231898 | 9/1996 |
| JP | H11209696 | 8/1999 |
| JP | 2002265849 | 9/2002 |
| JP | 2004043679 | 2/2004 |
| JP | 2004250653 | 9/2004 |
| JP | 2006077095 | 3/2006 |
| JP | 2007016096 | 1/2007 |
| JP | 2009127010 | 6/2009 |
| JP | 2009173815 | 8/2009 |
| JP | 2009185169 | 8/2009 |
| JP | 2009203341 | 9/2009 |
| JP | 2009203342 | 9/2009 |
| JP | 2009215527 | 9/2009 |

(Continued)

OTHER PUBLICATIONS

"Polymer Molecular Weight Distribution and Definitions of MW Averages", www.agilent.com/chem. 2015.*

(Continued)

*Primary Examiner* — Margaret G Moore

(74) *Attorney, Agent, or Firm* — Lisa E. Geary

(57) ABSTRACT

An erodible antifouling coating composition for application, for example, to ship's hulls to potentially prevent the adhesion and build-up of fouling agents on the hull is described. The coating composition includes 10 to 60% by solids weight of an erodible binder system that excludes a triorgano tin based binder; one or more antifouling agents; and 1 to 10% solids weight of a mixture of silicone oils, wherein the mixture includes a first and second silicone oil each comprising alkyl and aryl groups attached to silicone in a different ratio. A process for producing the composition, a substrate coated with the composition, and a process of coating a substrate with the composition are also described.

20 Claims, No Drawings

(56) References Cited

FOREIGN PATENT DOCUMENTS

| RU | 2 439 110 C2 | 1/2012 |
|---|---|---|
| RU | 2 479 608 C2 | 4/2013 |
| WO | 9839391 | 9/1998 |
| WO | 2009047955 | 4/2009 |

OTHER PUBLICATIONS

Espacenet English abstract of RU 2 439 110 C2.
Espacenet English abstract of RU 2 479 608 C2.
Espacenet English abstract of CN 102533106 A.

\* cited by examiner

ERODIBLE ANTIFOULING COATING COMPOSITION

This application is a national stage entry of International Application PCT/EP2015/056685, filed Mar. 27, 2015, which claims priority to EP 2014 0163448.5 filed Apr. 3, 2014.

The present invention relates to an erodible antifouling coating composition, such as a self-polishing or ablative coating composition. In particular, the present invention relates to an erodible antifouling coating composition comprising at least one silicone oil.

Traditionally, there are several ways that a coating composition can be designed to prevent the adhesion and build up of fouling agents on a surface. The coating can contain a biocide which serves to poison and/or deter the organism attached to the surface, thus causing the organism to fall off the surface. This mode of adhesion prevention is often referred to as "antifouling" and such coatings often referred to as antifouling coatings.

Such coatings may also be designed to slowly degrade or erode over time, thus organisms adhered to the surface will also gradually fall off the surface with the degradation of the coating or via concomitant release of biocide. The type of erosion of the surface varies but is generally based on the slightly soluble nature of the binder. The term ablative has been used to describe all these kinds of erosion. However, ablative also refers to a particular type of erosion which is also termed sloughing and is generally provided by slightly soluble binders such as rosin present in the binder. To avoid confusion therefore, by ablative herein we mean this sloughing type of erosion. Another type of degradation is commonly caused by a reaction at the surface in seawater such as hydrolysis leading to products which are then slightly soluble in seawater including the film forming polymer. This mode of adhesion prevention is often referred to as "self polishing" and such coatings are often referred to as self polishing coatings. Such coatings may possibly contain no biocide and may require less biocide than traditional ablative coatings.

Accordingly, in order to obtain an effective and efficient removal of organisms from surfaces it is now common practice to produce coating compositions that may usually contain a biocide and which slowly degrade over time. Such potentially dual functional coatings are often referred to as erodible antifouling coatings and include both self polishing and ablative coatings. However, in the present invention an erodible antifouling coating is not necessarily accompanied by an antifouling agent.

Erodible antifouling coating compositions are commonly applied to ships' hulls to reduce fouling of the hull. The coating compositions will commonly contain a self-polishing or ablative binder and usually one or more biocidal compounds.

Alternative, marine coatings are fouling release coatings. These coatings have a different mode of operation. They effectively provide a low surface energy or non-stick surface thus preventing adhesion of organisms.

The present invention addresses one or more of the above mentioned or other problems.

According to a first aspect of the present invention, there is provided an erodible antifouling coating composition comprising:
an erodible binder system excluding a triorgano tin based binder;
optionally, one or more antifouling agents;
and at least one silicone oil.

Advantageously, it has been surprisingly found that coating compositions according to the present invention comprising an erodible binder and at least one silicone oil may provide smooth surfaces with reduced drag and/or improved fouling resistance.

Suitable silicone oils for use with the present invention comprise or alternatively consist of polydiorganosiloxanes such as alkyl and/or aryl substituted polysiloxanes. The composition may comprise a mixture of silicone oils such as polydiorganosiloxanes defined herein differing in molecular weight and/or in the nature of the groups bonded to the silicon atoms. The silicon oils of the present invention are typically, non-reactive silicone oils.

Accordingly, silicone oils of the present invention may be a polyorganosiloxane having a structure defined by diorganosiloxane residues and terminal organosiloxane residues, and, optionally, branch organosiloxane residues.

Suitably, the diorganosiloxane residues of the polyorganosiloxane comprise or may be selected from one or more of

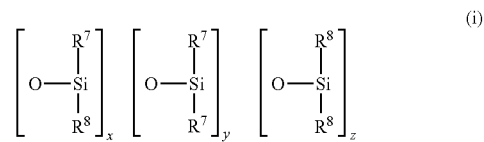

and;
the terminal organosiloxane residues comprise or are

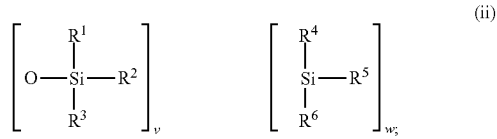

whereas the optional branch organosiloxane residues comprise or are;

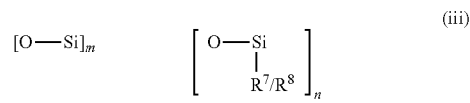

wherein,
$R^1$ to $R^6$ are independently, an inert optionally substituted organic group such as $C_{1-8}$ alkyl or aryl, generally, methyl or phenyl;
$R^7$ is an inert optionally substituted organic group such as aryl, generally phenyl;
$R^8$ is an inert optionally substituted organic group such as $C_{1-8}$ alkyl, generally, methyl or ethyl, optionally, methyl;
$v = n+2m+1$;
$w = 1$;
n is 0 to $x+y+z/3$, generally 0 to $x+y+z/10$, such as 0 to $x+y+z/50$, rounded to the nearest whole number;
m is 0 to $x+y+z/10$, generally 0 to $x+y+z/50$, such as 0 to $x+y+z/100$, rounded to the nearest whole number;
$x+y+z$ is 5 to 1000, generally 10 to 500, such as 20 to 200, with the proviso that diorganosiloxane residues selected from the structures in (i) above having $R^7$ groups and diorganosiloxane residues selected from the structures in (i) above having $R^8$ groups are present in the polyorganosiloxane.

In a first embodiment of the present invention, there is provided an erodible antifouling coating composition according to any aspect of the present invention, wherein the silicone oil comprises a polyorganosiloxane having a structure defined by diorganosiloxane residues and terminal organosiloxane residues, and, optionally, branch organosiloxane residues;

wherein the diorganosiloxane residues of the polyorganosiloxane are selected from one or more of

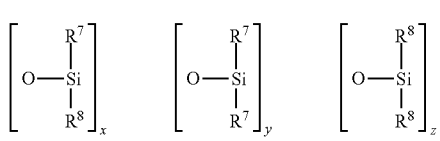

and;
the terminal organosiloxane residues are

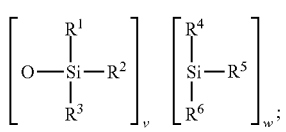

whereas the optional branch organosiloxane residues are;

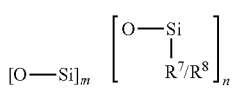

wherein,
$R^1$ to $R^6$ are independently, an inert optionally substituted organic group such as $C_{1-8}$ alkyl or aryl, generally, methyl or phenyl;

$R^7$ is an inert optionally substituted organic group such as aryl, generally phenyl;

$R^8$ is an inert optionally substituted organic group such as $C_{1-8}$ alkyl, generally, methyl or ethyl, optionally, methyl;

$v=n+2m+1$;
$w=1$;
n is 0 to $x+y+z/3$, generally 0 to $x+y+z/10$, such as 0 to $x+y+z/50$, rounded to the nearest whole number;
m is 0 to $x+y+z/10$, generally 0 to $x+y+z/50$, such as 0 to $x+y+z/100$, rounded to the nearest whole number;
$x+y+z$ is 5 to 1000, generally 10 to 500, such as 20 to 200, with the proviso that diorganosiloxane residues selected from the structures in (i) above having $R^7$ groups and diorganosiloxane residues selected from the structures in (i) above having $R^8$ groups are present in the polyorganosiloxane.

Accordingly, in the polyorganosiloxane as claimed (i)-(iii) and/or $R^1$ to $R^8$ may also alternatively be independently selected from the definitions of this embodiment.

It will be appreciated that when the polyorganosiloxane comprises one or more branching residues, the diorganosiloxane groups and optionally further branch organosiloxane residues may extend the branch and the terminal group of the optionally extended branch is formed by the oxy-substituted terminal residue and as such v will then be greater than 1 increasing in accordance with the number of branches requiring a terminal group.

The groups $R^1$ to $R^8$, of the silicone oil may independently be a substantially inert optionally substituted organic group. The silicone oil is generally substantially chemically inert with respect to the binder during normal use.

Typically, each of the $R^1$ to $R^6$ groups are independently selected from alkyl and aryl groups, $R^7$ is an aryl group and $R^8$ is an alkyl group. More typically, each of the $R^1$ to $R^6$ groups are independently selected from methyl and phenyl groups, $R^7$ is a phenyl group and $R^8$ is a methyl group.

Accordingly, in a second embodiment, there is provided an erodible antifouling coating composition according to the first embodiment wherein each of the $R^1$ to $R^6$ groups are independently selected from alkyl and aryl groups, R7 is an aryl group and R8 is an alkyl group. More typically, each of the $R^1$ to $R^6$ groups are independently selected from methyl and phenyl groups, $R^7$ is a phenyl group and $R^8$ is a methyl group.

Accordingly, in the polyorganosiloxane as claimed $R^1$ to $R^8$ may also be independently selected from the definitions of this second embodiment.

In an embodiment of the invention, an erodible antifouling coating composition according to the first aspect of the invention and/or the first and/or second embodiment above is a polydiorganosiloxane such as an alkyl and/or aryl substituted polysiloxane wherein the alkyl groups are saturated hydrocarbon radicals being straight or branched, polycyclic, acyclic, cyclic or part cyclic/acyclic moieties or combinations thereof and contain 1 to 10 carbon atoms, such as 1 to 8 carbon atoms, for example 1 to 6 carbon atoms, or 1 to 4 carbon atoms, or are selected from the group consisting of methyl, ethyl, n-propyl, isopropyl, n-butyl, sec-butyl, t-butyl, n-pentyl and cyclic or branched variants thereof, n-hexyl and cyclic or branched variants thereof, n-heptyl and cyclic or branched variants thereof and n-octyl and cyclic or branched variants thereof, more typically, from the group consisting of methyl, ethyl, n-propyl isopropyl and most typically, from methyl; and/or wherein the aryl groups are an organic radical derived from an aromatic hydrocarbon by removal of one hydrogen and include any monocyclic, bicyclic or polycyclic carbon ring of up to 7 members in each ring, wherein at least one ring is aromatic and more typically, wherein the aryl group is selected from such monocyclic and bicyclic rings, wherein said radical may be optionally substituted with one or more substituents independently selected from alkyl or alkoxy radicals, and/or wherein, the aryl groups are generally selected from the group consisting of phenyl, naphthyl, idenyl and alkyl substituted phenyl, more typically, methyl substituted phenyl and phenyl, most typically, phenyl.

The term "alkyl", as used herein, relates to saturated hydrocarbon radicals being straight or branched, polycyclic, acyclic, cyclic or part cyclic/acyclic moieties or combinations thereof and containing 1 to 10 carbon atoms, such as 1 to 8 carbon atoms, for example 1 to 6 carbon atoms, or 1 to 4 carbon atoms. The alkyl groups in the present invention and as claimed may alternatively be selected from the group consisting of methyl, ethyl, n-propyl, isopropyl, n-butyl, sec-butyl, t-butyl, n-pentyl and cyclic or branched variants thereof, n-hexyl and cyclic or branched variants thereof, n-heptyl and cyclic or branched variants thereof and n-octyl and cyclic or branched variants thereof, more typically, from the group consisting of methyl, ethyl, n-propyl isopropyl and most typically, from the group consisting of methyl.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. The aryl group may be selected from such monocyclic and bicyclic rings. Said radical may be optionally substituted with one or more substituents independently selected from alkyl or alkoxy radicals. The aryl groups in the present invention and as claimed may alternatively be selected from the group consisting of phenyl, naphthyl, idenyl and alkyl substituted phenyl, more typically, methyl substituted phenyl and phenyl, most typically, phenyl.

The term "alkenyl", as used herein, relates to hydrocarbon radicals having one or several, suitably up to 4, double bonds, being straight, branched, cyclic or polycyclic moieties or combinations thereof and containing from 2 to 18 carbon atoms, such as 2 to 10 carbon atoms, or from 2 to 8 carbon atoms, for example 2 to 6 carbon atoms, or 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like.

When the silicone oil is of the structure above, generally, at least 10% of the total $R^7$ and $R^8$ groups are alkyl and at least 10% of total $R^7$ and $R^8$ groups are aryl, such as at least 30% of total $R^7$ and $R^8$ groups being alkyl and at least 10% of total $R^7$ and $R^8$ groups being aryl.

Accordingly, in suitable embodiments and as claimed $R^1$ to $R^6$ of the silicone oil of the present invention may alternatively each be independently selected from methyl and phenyl. Typically, at least some of $R^8$ groups are methyl and some of $R^7$ groups are phenyl, more typically, at least 10% of the $R^8$ groups are methyl and at least 10% of $R^7$ groups are phenyl, most typically, at least 30% of $R^8$ groups are methyl and at least 10% of $R^7$ groups are phenyl.

Accordingly, the molecular weight (Mw) of the silicone oil of the present invention may be between 1000 and 100,000 Daltons, such as between 2000 and 50,000, for example 5000 and 25,000 Daltons. A suitable method for determining molecular weight of the silicone oil is mass spectrometry.

Suitably at least 50% of the total radicals $R^7$ and $R^8$ in the silicone oil are alkyl, typically, methyl radicals. The silicone oil may also contain aryl, such as phenyl radicals. The proportion of the total radicals $R^7$ and $R^8$ in the silicone oil which are aryl, typically, phenyl radicals may be at least 0.1% and may be up to 50%, for example 0.2 to 50%. Typical examples of the groups (i) include $(CH_3)_2SiO$, $CH_3(C_6H_5)SiO$ and $(C_6H_5)_2SiO$.

Accordingly, the silicone oil of the present invention may be a methyl phenyl silicone oil in which, optionally, at least 25% of the diorganosiloxane units are methylphenylsiloxane units. The silicone oil of the present invention may be a trimethylsilyl-terminated poly(methylphenylsiloxane).

The composition may comprise a silicone oil having of the total organo groups attached to silicon in the siloxane, a proportion of between 50% and 95% alkyl groups, such as between 60% and 90% alkyl groups, typically methyl.

The composition may comprise a silicone oil having of the total organo groups attached to silicon in the siloxane, a proportion of between 5% and 50% aryl groups, such as between 10 and 40% aryl groups, typically phenyl.

The composition may comprise a silicone oil having of the total organo groups attached to silicon in the siloxane, a proportion of aryl groups such as phenyl in the range of 5% to 50% and alkyl groups such as methyl in the range of 50% to 95%. For example, the composition may comprise a silicone oil having of the total organo groups, a proportion of aryl groups such as phenyl in the range of 10% to 40% and alkyl groups such as methyl in the range of 60% to 90%.

The composition may comprise at least a first and a second silicone oil.

Optionally, the first silicone oil comprises alkyl and aryl organo groups attached to silicon in the siloxane in a first ratio, and the second silicone oil comprises alkyl and aryl organo groups in a second ratio, wherein, optionally, the first ratio and the second ratio are different.

Optionally, the total organo groups of the first silicone oil comprise alkyl groups in the proportion of 70% to 95%, such as 80% to 90%, and/or aryl groups in the proportion of 5% to 30%, for example 10 to 20%, and/or optionally, the total organo groups of the second silicone oil comprise alkyl groups in the proportion of 50% to 80%, such as 60% to 70%, and/or aryl groups in the range of 20% to 50% total groups, for example 30% to 40%.

The first silicone oil and the second silicone oil may be contained in the antifouling composition in a ratio of between 10:1 to 1:10 by weight, such as in a ratio of between 10:1 and 1:2 by weight, for example in a ratio of between 10:2 and 1:1, or in a ratio of between 10:5 and 10:8, such as in a ratio of between 10:6 and 10:7.5 by weight.

Advantageously, it has been surprisingly found that when an erodible antifouling coating composition comprises at least a first and a second silicone oil in ratios according to the present invention, the coating layers may provide the erosion rate and/or the antifouling resistance of conventional antifouling coatings, combined with the further advantage of improved coating smoothness and/or reduced drag.

Further, it has been found that compositions comprising the above combinations of oils may provide suitable can stability, even with known sensitive binders such as zinc and silyl acrylates.

The silicone oil or if more than one the first silicone oil may have a density at 25° C. of between 900 to 1100 kg/m³, such as between 980 to 1000 kg/m³.

The second silicone oil may have a density at 25° C. of between 1000 to 1200 kg/m³, such as between 1055 and 1075 kg/m³.

The density may be measured using a pycnometer and a suitable balance.

The silicone oil or if more than one the first silicone oil may have a viscosity of between 70 to 130 mm²/s at 25° C., such as between 90 to 110 mm²/s.

The second silicone oil may have a viscosity of between 95 to 155 mm²/s at 25° C., such as between 115 to 135 mm²/s. The viscosity may suitably be measured using a Brookfield Viscosimeter, for instance type LV, RV, HA, AB and the corresponding spindles.

Suitable silicone oils are 510V100 and 550 silicone oils. Commercially available 510V100 and 550 silicone oils include Bluesil oil 510V100 and/or Bluesil oil 550 (both available from Bluestar Silicones).

The level of silicone oil in the coating composition may be between 1 and 10 volume solids %, such as between 3 and 8 volume solids % or between 5 and 7 volume solids %. By volume solids in this context it will be understood that the oil is included as a solid.

Accordingly, in one embodiment, a silicone oil may be an alkyl-, such as a methyl-, terminated poly(methylphenylsiloxane) having a molecular weight in the range 5-25,000 Daltons, a methyl:phenyl ratio of between 5:1 and 20:1, wherein at least 95% of the substituents are methyl or phenyl and wherein the oil is present in the composition at a level of 3 to 8% by volume solids. In some embodiments, this silicone oil may be a first silicone oil and a second silicon oil may also be present wherein a second silicone oil is also a methyl-terminated poly(methylphenylsiloxane) having a molecular weight in the range 5-25,000 Daltons, a methyl:phenyl ratio of between 1:1 and 5:1, wherein at least 95% of the substituents are methyl or phenyl and wherein the total first and second oil is present in the composition at a level of 3 to 8% by volume solids.

Erodible antifouling coating compositions are known to those skilled in the art. Generally, such compositions are self-polishing or ablative or a combination of the two. Typically, a self-polishing binder system generally comprises or consists of a dissolving film forming polymer whereas an ablative binder system comprises a soluble component such as a rosin or rosin derivative but may also comprise a non-erodible or erodible or part erodible matrix or film forming co-binder component(s).

Erodible binders such as self-polishing or ablative binders are effective by being generally slightly soluble in use so that gradual erosion of the binder takes place thereby gradually releasing surface binder and, if present, biocide. This may take place in a fresh water or seawater environment. A seawater environment is mildly alkaline so that the erodible binders are designed to be slightly soluble in such an environment. Accordingly, the erodible such as self-polishing or ablative binders of the present invention may be alkaline soluble binders. The alkaline soluble binders of the present invention may be film forming binders operable to be self-polishing or ablative during normal use, for example, on a ship's hull when exposed to seawater. The pH of seawater is slightly alkaline at typically, 8-8.2. The erodible binders such as self-polishing and ablative binders are generally slightly soluble in such alkaline conditions. Binders for ablative coatings, such as those comprising rosins, rosin derivatives, polyvinyl methyl ether and/or vinyl chloride are immediately slightly soluble under such conditions whereas self polishing binders are generally initially reactive to render them soluble for example they may be hydrolysable to produce soluble by-product and soluble binder. In addition, a binder which is not itself self-polishing such as rosin or a rosin derivative may be incorporated into a self-polishing binder system through use of a self-polishing co-binder. In any case, as the binder slowly dissolves there is usually release of biocide either directly through the reaction with sea water or indirectly through release of biocide held in the dissolving matrix and exposure of underlying surface layer so that the process is continuous.

Accordingly, the erodible binder system of the present invention may be self-polishing, typically alkaline hydrolysable or ablative.

By alkaline soluble herein is meant at least slightly soluble at pH above 7, typically 7-9, more typically, 7.5 to 8.5 and includes slightly soluble in seawater at pH of 7.9-8.3, for example 8-8.2.

By hydrolysable herein is meant hydrolysable in use in an aquatic, more typically, a seawater environment such as those having a pH as described for alkaline soluble above. A binder of the present invention will generally be hydrolysed and/or dissolve under slightly alkaline conditions such a pH 7-9 such as in seawater. Accordingly, the binder may have suitable groups for hydrolysis such as hydrolysable ester groups or may be in the form of metal salts and/or the binder may be or may include components which are at least slightly soluble in an aquatic, such as a seawater, environment. The skilled person will appreciate that a definition of the extent of solubility is not necessary and that this is governed by the desirable erosion rate of the binder and, if present, release of biocide. If the skilled person requires high erosion rate then the binder can be selected for higher solubility and/or higher reactivity in a marine environment whereas if very slow erosion is required then lower solubility and/or reactivity is required. The formulator will choose the appropriate binder system for the required application which provides a balance between erosion and release of biocide and re-coating interval. It will be appreciated that the present invention relates to the advantageous properties of the silicone oil when used in combination with an erodible binder system typically provided by a self polishing or ablative binder and the erosion rate is merely mentioned to further distinguish the erodible binder from the quite different fouling release binders known to the skilled person which are not designed to be in any practical way soluble or slightly soluble in a marine environment.

Self-polishing binder systems, such as silyl acrylate based binders and zinc and copper acrylate binders, comprise a seawater hydrolysable or exchangeable pendent group. Removal of the pendent group by hydrolysis/ion exchange in situ is understood by the skilled person to generate the soluble binder and side products. Ablative binders generally have a soluble component such as gum rosin or metal resinates which are slightly soluble and leach out of the matrix thus releasing biocide. In contrast to fouling release coatings, which have a hard non-ablating non-stick surface to prevent the attachment of marine organisms, erodible anti-fouling coatings prevent attachment by the steady erosion of the coating layer and generally the release of biocidal compounds. As such, the topography of the erodible antifouling coating layer is variable initially and over time, which can result in uneven surfaces and increased drag.

Accordingly, by erodible herein is not meant erodible in an absolute sense and under any conditions but is meant to distinguish coatings of the invention which slowly erode under aquatic conditions, typically, those conditions found in sea water, from fouling release coatings which are not effective by being erodible under aquatic conditions but rather are effective by presenting a low surface energy surface to the aquatic organism. Typically, a dried erodible coating composition of the present invention coated on a substrate would have an erosion rate in seawater of at least 1 µm per month at 10 knots, more typically, 2 or 3 µm per month at 10 knots.

Advantageously, it has surprisingly been found that coating layers formed form coating compositions according to the present invention may show one or more of an highly regular erosion rate and/or an excellent fouling resistance and/or an improved surface smoothness after coating compared to prior art erodible antifouling coating compositions such as self-polishing or ablative antifouling coating compositions. The applicant has found that improved surface smoothness may be achieved after coating compared to prior art erodible antifouling coating compositions such as self-polishing or ablative coating compositions. Improved surface smoothness substantially immediately after coating provides reduced drag and thus improved fuel efficiency for boats comprising the coatings formed from the present invention.

The erodible binder system of the present invention may generally include any suitable self polishing or ablative binder but typically includes an effective amount of an alkaline soluble binder. The erodible binder of the erodible binder system may be an effective amount of an alkaline soluble binder selected from a rosin based binder, a zinc resinate based binder, a copper resinate based binder, a silyl acrylate such as silyl (meth) acrylate based binder or a metal (such as copper, zinc, magnesium or calcium) acrylate based binder including copolymers and/or mixtures thereof, such as, an alkaline soluble binder selected from a zinc acrylate based binder, a copper acrylate based binder, a silyl acrylate based binder and a silyl acrylate/zinc acrylate based copolymer binder.

Rosin typically comprises a mixture of resin acids, chiefly abietic acid, being a polycyclic monocarboxylic acid. Accordingly, "rosin" as used herein also refers to such mixtures. Rosin as used herein also refers to synthetically produced rosin or resin acids, to pure or substantially pure resin acids, such as abietic acid and to metal resinates such as copper, calcium, magnesium or zinc resinates.

Commercially available rosin based binders may include one or more of gum rosin, hydrogenated rosin, modified rosin such as maleic rosin and dimerized rosin or metal resinates. Suitable gum and hydrogenated rosin may be selected from Indonesian, Portugese, Brazilian, and Chinese Gum Rosin, Foral type (hydrogenated rosin) and Foralyn type (hydrogenated rosin esters).

Zinc resinate may be made in situ from rosin and zinc oxide. Commercially available Zn, Ca and Mg resinates are Bremazit types.

Copper resinates are generally made in situ from rosin and copper oxide (I).

The silyl acrylate based binder may be a binder comprising monomers in accordance with formula I:

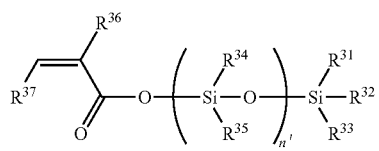

Formula I wherein
$R^{31}$, $R^{32}$, $R^{33}$, $R^{34}$, $R^{35}$ each independently represent an alkyl, an aryl group or a hydrogen atom,
$R^{36}$ represents a hydrogen atom or a methyl group,
$R^{37}$ represents a hydrogen atom or an alkyl group, typically, hydrogen,
n' represents a number of diorganosiloxane units from 0 to 200.

The silyl acrylate based binder may be selected from copolymers of triisopropylsilyl (meth)acrylate (TIPSA), or tri-t-butylsilyl(meth)acrylate with optionally one or more suitable comonomers or mixtures thereof.

The silyl acrylate based binder may have a number average molecular weight (Mn) of between 30 kDa and 70 kDa, such as between 40 kDa and 60 kDa. A suitable method for determining molecular weight of the silicone oil is mass spectrometry.

A commercially available silyl acrylate based binders is Polyace NSP-100 (available from Nitto Kasei). Silyl-zinc acrylate binders are available from Mitsubishi Rayon Corporation.

Suitable metal acrylate based binders of the present invention are known to the skilled person but may be an acrylic copolymer having at least one side chain bearing a group of the formula II

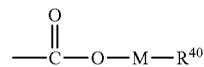

II wherein M is Zn, Ca, Mg or Cu, more typically, Zn or Cu and $R^{40}$ represents an organic acid residue selected from

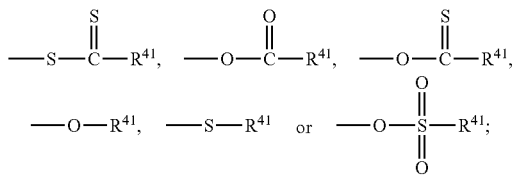

wherein $R^{41}$ is a monovalent organic residue.

Typically, $R^{41}$ is an hydrocarbon residue of 1-20 carbon atoms, usually 1-6, more usually 1-4 carbon atoms which may be linear or branched, be saturated or unsaturated, be cyclic, acylic or part acylic/cyclic but is usually, saturated.

Typically, the organic acid residue is a carboxylic acid residue of formula

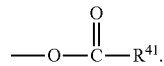

The binder system may be a copolymer as mentioned above or may include a co-binder (co)polymer and in either case typically incorporates or in the case of a co-binder may be made up of other (co)monomer residues such as acrylic and vinyl monomer residues. Suitable comonomers for the copolymer (co)binders of the present invention may be selected from suitable vinyl and acrylate comonomers or the like known to those skilled in the art.

Examples of comonomers are vinyl aromatic compounds and alkyl or aryl esters of (meth)acrylic acid or anhydride. Suitable vinyl aromatic compounds include styrene, alpha-methylstyrene, alpha-chloromethyl styrene and vinyl toluene. Suitable alkyl esters of acrylic and methacrylic acid or anhydride include those wherein the alkyl portion of the ester contains from about 1 to about 30, such as 4 to 30 carbon atoms, in which the alkyl group may be linear or branched, saturated or unsaturated, cyclic, acylic or part acylic/cyclic. Suitable specific acrylic comonomers include alkyl acrylates such as methyl acrylate, n-butyl acrylate and t-butyl acrylate, 2-ethylhexyl acrylate, isobornyl acrylate, cyclohexyl acrylate, t-butyl cyclohexyl acrylate, trimethyl cyclohexyl acrylate, lauryl acrylate, and the like; alkyl methacrylates, including methyl methacrylate, n-butyl methacrylate, t-butyl methacrylate, 2-ethylhexyl methacrylate, isobornyl methacrylate, cyclohexyl methacrylate, t-butyl cyclohexyl methacrylate, trimethyl cyclohexyl methacrylate, and lauryl methacrylate; and aryl (meth)acrylates including acrylate and methacrylate esters of secondary and tertiary butylphenol substituted in the 2, 3 or 4 position and nonylphenol.

Functional group-containing comonomers may also be used in preparing the copolymers of the binder system such comonomers may containing hydroxyl groups, amine groups, epoxy groups, and carboxylic acid groups, to name a few. Examples of such comonomers containing hydroxyl groups are hydroxyalkyl functional acrylates and methacrylates such as hydroxyethyl acrylate, hydroxyethyl methacrylate, hydroxypropyl acrylate, hydroxypropyl methacrylate, 4-hydroxybutyl acrylate, 4-hydroxybutyl methacrylate and the like. Mixtures of these hydroxyalkyl functional monomers may also be used. Examples of amine group-containing monomers are t-butylaminoethyl (meth)acrylate and aminoethyl (meth)acrylate. Examples of carboxylic acid group-containing monomers are (meth)acrylic acid, crotonic acid and itaconic acid. Examples of epoxy group-containing monomers include glycidyl (meth)acrylate.

Comonomers may be selected from one or more of styrene, C1-C4 alkyl acrylate, methyl methacrylate, acrylic acid and methacrylic acid.

The amount of erodible binder system in the composition may be between 1% to 80% by weight of the solid content in the antifouling coating, such as 10% to 60% by weight solids. The amount of erodible binder in the erodible binder system depends upon whether a non-erodible co-binder is present. Where a co-binder is not present or where the co-binder(s) are erodible, the amount of erodible binder may be 80-100% w/w of the erodible binder system. However, if a non-erodible co-binder is present, the amount of erodible binder in the erodible binder system may be from 10% w/w to 95% w/w of the erodible binder system, more typically, 20-90% w/w.

The antifouling agent may be a biocidal agent used as a component in the coating composition of the present invention and may be any of one or more conventionally known antifoulants. The known antifoulants are roughly divided into inorganic compounds, metal-containing organic compounds, and metal-free organic compounds.

Examples of the inorganic compounds include copper compounds (e.g. copper sulphate, copper powder, cuprous thiocyanate, copper carbonate, copper chloride, and cuprous oxide), zinc sulphate, zinc oxide, nickel sulphate, and copper nickel alloys.

Examples of the metal-containing organic compounds include organo-copper compounds, organo-nickel compounds, and organo-zinc compounds. Also usable are manganese ethylene bis dithiocarbamate (maneb), propineb, and the like. Examples of the organo-copper compounds include copper nonylphenol-sulphonate, copper bis(ethylenediamine) bis(dodecylbenzene sulphonate), copper acetate, copper naphthenate, copper pyrithione and copper bis(pentachlorophenolate). Examples of the organo-nickel compounds include nickel acetate and nickel dimethyl dithiocarbamate. Examples of the organo-zinc compounds include zinc acetate, zinc carbamate, bis(dimethylcarbamoyl) zinc ethylene-bis(dithiocarbamate), zinc dimethyl dithiocarbamate, zinc pyrithione, and zinc ethylene-bis(dithiocarbamate). As an example of mixed metal-containing organic compound, one can cite (polymeric) manganese ethylene bis dithiocarbamate complexed with zinc salt (mancozeb).

Examples of the metal-free organic compounds include N-trihalomethylthiophthalimides, trihalomethylthiosulphamides, dithiocarbamic acids, N-arylmaleimides, 3-(substituted amino)-1,3 thiazolidine-2,4-diones, dithiocyano compounds, triazine compounds, oxathiazines and others.

Examples of the N-trihalomethylthiophthalimides include N-trichloromethylthiophthalimide and N-fluorodichloromethylthiophthalimide.

Examples of the dithiocarbamic acids include bis(dimethylthiocarbamoyl) disulphide, ammonium N-methyldithiocarbamate and ammonium ethylene-bis(dithiocarbamate).

Examples of trihalomethylthiosulphamides include N-(dichlorofluoromethylthio)-N',N'-dimethyl-N-phenylsulphamide and N-(dichlorofluoromethylthio)-N',N'-dimethyl-N-(4-methylphenyl)sulphamide.

Examples of the N-arylmaleimides include N-(2,4,6-trichlorophenyl)maleimide, N-4 tolylmaleimide, N-3 chlorophenylmaleimide, N-(4-n-butylphenyl)maleimide, N-(anilinophenyl)maleimide, and N-(2,3-xylyl)maleimide.

Examples of the 3-(substituted amino)-1,3-thiazolidine-2,4-diones include 2-(thiocyanomethylthio)-benzothiazole, 3-benzylideneamino-1,3-thiazolidine-2,4-dione, 3-(4-methylbenzylideneamino)-1,3-thiazolidine-2,4-dione, 3-(2-hydroxybenzylideneamino)-1,3-thiazolidine-2,4-dione, 3-(4-dimethylaminobenzylideamino)-1,3-thiazolidine-2,4-dione, and 3-(2,4-dichlorobenzylideneamino)-1,3-thiazolidine-2,4-dione.

Examples of the dithiocyano compounds include dithiocyanomethane, dithiocyanoethane, and 2,5-dithiocyanothiophene.

Examples of the triazine compounds include 2-methylthio-4-butylamino-6-cyclopropylamino-s-triazine.

Examples of oxathiazines include 1,4,2-oxathiazines and their mono- and di-oxides, mono- and di-oxides of 1,4,2-oxathiazines with a substituent in the 3 position representing (a) phenyl; phenyl substituted with 1 to 3 substituents independently selected from hydroxyl, halo, C1-12 alkyl, C5-6 cycloalkyl, trihalomethyl, phenyl, C1-C5 alkoxy, C1-5 alkylthio, tetrahydropyranyloxy, phenoxy, C1-4 alkyl carbonyl, phenyl carbonyl, C1-4 alkylsulfinyl, carboxy or its alkali metal salt, C1-4 alkoxycarbonyl, C1-4 alkylaminocarbonyl, phenylaminocarbonyl, tolylaminocarbonyl, morpholinocarbonyl, amino, nitro, cyano, dioxolanyl or C1-4 alkyloxyiminomethyl; naphthyl; pyridinyl; thienyl; furanyl; or thienyl or furanyl substituted with one to three substituents independently selected from C1-C4 alkyl, C1-4 alkoxy, C1-4 alkylthio, halo, cyano, formyl, acetyl, benzoyl, nitro, C1-C4 alkoxycarbonyl, phenyl, phenylaminocarbonyl and C1-4 alkyloxyiminomethyl; or (b) a substituent of generic formula

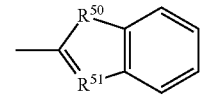

wherein $R^{50}$ is oxygen or sulphur; $R^{51}$ is nitrogen, CH or C(C1-4 alkoxy); and the C6 ring may have one C1-4 alkyl substituent; a second substituent selected from C1-4 alkyl or benzyl being optionally present in position 5 or 6.

Other examples of the metal-free organic compounds include 2,4,5,6-tetrachloroisophthalonitrile, N,N-dimethyl-dichlorophenylurea, 4,5-dichloro-2-n-octyl-4-isothiazoline-3-one, N,N-dimethyl-N'-phenyl-(N-fluorodichloromethylthio)-sulfamide, tetramethylthiuramdisulphide, 3-iodo-2-propinylbutyl carbamate, 2-(methoxycarbonylamino) benzimidazole, 2,3,5,6-tetrachloro-4-(methylsulphonyl) pyridine, diiodomethyl-p-tolyl sulphone, phenyl (bispyridine)bismuth dichloride, 2-(4-thiazolyl) benzimidazole, dihydroabietyl amine, N-methylol formamide, 4-Bromo-2-(4-chlorophenyl)-5-(trifluoromethyl)-1H-pyrrole-3-carbonitrile (tralopyril), and pyridine triphenylborane.

Among the fouling organisms, barnacles have proved to be the most troublesome, because they resist to most biocides. Accordingly, the coating composition may also include at least an effective amount of at least one specific barnaclecide, such as cuprous oxide or thiocyanate or tralopiryl (such as Econea from Janssen).

Preferably, the coating compositions may comprise a combination of organic and inorganic biocidal agents. Typically, the biocidal agent may comprise an isothiazolinone, pyrithione, for example zinc pyrithione or tralopiryl based antifoulant and/or copper oxide.

An antifouling agent may be present in the coating composition in an amount of between 2% to 60% by weight, such as between 15% to 40% by weight.

The coating composition may further comprise a suitable liquid carrier, typically a solvent. For example, the composition may comprise an aromatic hydrocarbon, cyclic hydrocarbon, alcohol, acetate, and/or ketone based solvent—such as ethyl acetate, butyl acetate, methylethyl ketone, methyl isobutyl ketone, ethylene glycol monoethylether acetate, methoxypropyl acetate, toluene, xylene, white spirit, ethoxypropyl acetate, ethoxyethyl propionate, methoxybutyl acetate, butyl glycol acetate, solvent naphtha, n-butanol and mixtures of these solvents.

Notwithstanding the above, the coating composition of the invention also extends to the dried coating after evaporation of the solvent or liquid carrier. In particular, it should be noted that the binder system, the silicon oil and the optional antifouling agent are present in both undried and dried coating composition.

Further additives to be used if required are, for example, plasticizers such as, for example, tricresyl phosphate, phthalic diesters or chloroparaffins; pigments such as colour pigments, bright pigments, and extender pigments and fillers, such as titanium oxide, barium sulphate, chalk, talc, clay, silica white, alumina white, bentonite, carbon black; zirconium oxide, graphite, red iron oxide, phthalocyanine green, phthalocyanine blue, quinacridone; catalysts such as, for example, N,N-dimethylbenzylamine, N-methylmorpholine, zinc octoate, tin(II) octoate and dibutyltin dilaurate; levelling agents; thickeners; stabilizers, such as substituted phenols or organ functional silanes; wax such as polyaminde wax; dehydrators such as aluminosilicate based dehydrators; soybean oil Adhesion promoters and light stabilizers may also be utilised.

According to another aspect of the present invention there is provided a substrate, typically, a metal substrate, at least partially coated with a coating composition according to the present invention.

Optionally, the substrate may be a primer coated and/or intermediate and/or otherwise suitably coated, substrate. A suitable substrate is an underwater structure such as the surface of a ship's hull whether primer and/or intermediate and/or otherwise suitably coated or not.

The antifouling coating composition of the present invention can be prepared for example by combining the erodible binder, silicone oil(s), a solvent and any other conventional components such as co-binder resins included in the erodible binder system, a biocidal agent, a pigment, a plsticizer, a coating-abrasion regulator, etc. and then mixing them by a mixer such as a ball mill, a pebble mill, a roll mill or a sand grind mill.

Typically, when over-coating of an erodible antifouling coating layer is required, the old coating is washed and/or sweep blasted such that whatever leach layer is present, if any, is removed before over-coating with a new coating layer according to the invention. Little or no leach layers are commonly found for self-polishing antifouling coating compositions. In any case, a dry coating film of the present invention can be formed by applying the undried antifouling coating composition described above in an usual manner onto the surface of a leach layer free substrate to be coated and then removing the solvent through evaporation at ordinary temperature or under heating. The leach layer free substrate may be a metal substrate, a primer layer, an intermediate layer, or a previous erodible antifouling coating.

All of the features contained herein may be combined with any of the above aspects and in any combination.

EXAMPLES

The invention will be further discussed with reference to the following non-limiting examples.

In the examples, the following test methods were employed:

Test Methods

Stability at 40° C.

The stability of the viscosity of the paint samples was monitored at 40° C. for 1 year. The viscosity was determined every three months.

Polishing

The paint formulations were sprayed on discs. These discs were rotated in seawater. Before the start of the rotation, the layer thickness of the paint samples on the discs was measured. The decrease in layer thickness (polishing) was then measured every ten weeks.

Static Raft Performance

Paint formulations were sprayed on panels. These panels were exposed in seawater in different marine locations. Quarterly pictures were taken and the static raft performance was judged on slime, soft fouling and hard fouling.

Boottop performance

Paint formulations are sprayed on panels. Panels are exposed to seawater and every ten weeks the panels are taken out of the water and exposed on an exposition field outside. Panels are judged every 10 weeks on physical properties-blisters, cracking and detachment.

Drag/torque measurements

Paint formulations are sprayed on discs. Discs are rotated in a container filled with seawater. The torque of the rotating disks is measured at various speeds and at various times.

Particle size is determined with a fineness gauge: a small amount of paint is placed in the deep end of the groove of a fineness gauge. With a straight edge scraper the paint is drawn towards the shallow end of the groove. Fineness indication of the paint is at the point of the scale where the oversized particles appear in a substantial concentration.

Dispersing is generally done by means of a dissolver at high speed.

EXPERIMENTAL

Example 1

| Rosin based AF | |
| --- | --- |
| Raw Material | Amount [kg] |
| Lutonal A25 | 1.40 |
| Rosin | 16.65 |
| Byk 065 | 0.39 |
| Rhodorsil oil 550 | 1.10 |
| Rhodorsil oil 510V100 | 1.48 |
| Seanine 211 | 7.38 |
| Bayferrox 222FM | 8.85 |
| Disparlon 6650 | 0.51 |
| ZnO indirect Serena | 23.83 |
| Finntalc M40 | 12.38 |
| Econea 028 | 3.51 |
| Bentone SD-2 | 1.15 |
| Xylene | 21.37 |
| Total | 100.00 |

Key:-
Lutonal A25 — Plasticiser
Byk 065 — Defoamer
Rhodorsil oil 510 V 100/Dow Corning 51 — Methyl phenyl polysiloxane oil
Rhodorsil oil 550/Dow Corning 550 — Methyl phenyl polysiloxane oil
Sea-Nine 211 — Isothiazolinone based antifoulant
Bayferrox 222 FM — Iron Oxide Pigment
Disparlon 6650 — Thixotropic Agent
Finntalc M40 — Talc Filler
Econea 028 — Biocidal Agent
Bentone SD-2 — Thixotropic Agent Binder (rosin) is dissolved in solvent (xylene/seanine) and when the binder is dissolved, plasticizer (lutonal) and defoamer (BYK 065) are added. Thixotropic agents (Disparlon and Bentone) are added and activated by dispersing for 15 minutes. All the pigments and biocidal agent (ZnO, Finntalc, Econea Bayferrox) are then added and the mixture is dispersed until a particle size fineness of 45-50 μm and a temperature of up to 60° C. is reached. Release oils (oil 550 and 510V100) are then added and viscosity of final paint is adjusted with solvent.

Example 2

| Silylacrylate based AF | |
| --- | --- |
| Raw Material | Amount [kg] |
| Polyace NSP100 | 20.19 |
| Vestinol AH | 1.77 |
| Thixatrol ST | 0.97 |
| Rosin | 4.60 |
| Rhodorsil oil 550 | 2.36 |
| Rhodorsil oil 510V100 | 1.29 |
| Seanine 211 | 6.05 |
| Cuprous oxide | 40.51 |
| Bayferrox 222 FM | 4.73 |
| ZnO direct EMP | 9.51 |
| Sylosive A4 | 1.26 |
| Finntalc M40 | 1.18 |
| xylene | 5.57 |
| Total | 100.00 |

Key:-
Polyace NSP-100 — Silyl acrylate binder
Vestinol AH — Plasticiser
Thixatrol ST — Thixotropic Agent
Zinc oxide Direct EMP — ZnO Filler
Sylosive A4 — dehydrator Binder (rosin) is dissolved in solvent (xylene/seanine). When binder is dissolved, plasticizer (Vestinol AH) and binder (Polyace) are added. Thix agent (Thixatrol) and water scavenger (Sylosiv A4) are added and activated by dispersing for 15 minutes. All pigments (ZnO, Bayferrox and Cu$_2$O) are added and the mixture is ground until a particle size fineness of 45-50 μm (grinding is done by means of a bead-mill) and temperature of max. 60° C. is reached. Release oils (oil 550 and 510V100) are added and viscosity of final paint is set with solvent.

Example 3

| Silylacrylate based AF | |
| --- | --- |
| Raw Material | Amount [kg] |
| Polyace NSP-100, | 19.990 |
| Lankroflex E2307/Dehysol D 81, | 1.780 |
| Sea-Nine 211 | 6.00 |
| Indonesian Gum Rosin | 4.56 |
| Disparlon A603-20X | 4.67 |
| Sylosiv A4 | 1.25 |
| Bayferrox 222 FM | 4.70 |
| Cuprous oxide, Red | 40.12 |
| Zinc oxide Direct EMP | 9.42 |
| Finntalc M40 | 1.17 |
| Xylene | 4.09 |
| Rhodorsil oil 510 V 100/Dow Corning 51 | 1.29 |
| Rhodorsil oil 550/Dow Corning 550 | 0.960 |

Key:-
Lankroflex E2307/Dehysol D 81 — Plasticiser
Indonesian Gum Rosin — Binder self polishing
Cuprous oxide, Red — Biocidal Agent
Disparlon A603-20X — Polyamide wax Binder (rosin) is dissolved in solvent (xylene/seanine) when binder is solved; plasticizer (lankroflexl) and binder Polyace are added. Water scavenger (sylosive) and thix agent (disparlon) are added and dispersed. All pigments (ZnO, Finntalc, Bayferrox and Cu$_2$O) are added and the mixture is ground until a particle size fineness of 45-50 μm and temperature of max. 60° C. is reached. Release oils (oil 550 and 510V100) are added and viscosity of final paint is set with solvent.

Preparative Example 4

| Zinc acrylate based AF | |
| --- | --- |
| Raw Material | Amount [Kg] |
| Dianal MR-9393 (Zinc Acrylate self polishing binder) | 48.55 |
| Rhodorsil oil 550 | 1.16 |
| Rhodorsil oil 510V100 | 2.12 |
| Blanc fixe | 16.01 |
| Finntalc M15 | 5.67 |
| Zinc Omadine | 7.35 |
| Econea 028 | 4.71 |
| Bayferrox 130 BM | 6.01 |

-continued

| Zinc acrylate based AF | |
|---|---|
| Disparlon A603-20X | 5.01 |
| Xylene | 3.41 |
| Total | 100.00 |

Key:-
Dianal MR-9393    Zinc Acrylate self polishing binder
Blanc fixe        Filler
Finntalc M15      Talc Filler
Zinc Omadine      Biocidal Agent
Bayferrox 130 BM  Iron Oxide Pigment To binder (Dianal MR9393), pigments (blanc fixe, finntalc, zinc omadine, econea and bayferrox) and thix agent (Disparlon) are added and the mixture is ground until a particle size fineness of 45-50 μm and temperature of max. 60° C. is reached. Release oils (oil 550 and 510V100) are added and viscosity of final paint is set with xylene.

Results

TABLE 1 results for examples 1, 2 and 3

| | Example 1 | Example 2 | Example 3 |
|---|---|---|---|
| Stability 1 year @40° C. in [mPas · s] | 25.9 | 19.5 | 22.1 |
| Polishing | −6.6 μm/month | −2.20 μm/month | −1.87 μm/month |
| Static raft performance Mediterranean | 0% barnacles <10% algae | 0% barnacles <10% algae | 0% barnacles <10% algae |
| Boottop performance | No defects | No defects | No defects |
| Draq torque measurements | — | Less drag than without release oils | — |

Oil Combinations Tested

Example 1 and 2 formulations were also tested and compared with single release oils DC 3074—a methoxy-functional silicone intermediate, Rhodorsil oil 510V100 and Rhodorsil oil 550.

TABLE 2 results for example 1 (rosin based) with different oils

| | Comparative Example 1— Example 1 Without silicone oil | Example 5— Example 1 with oil 550 | Example 6— Example 1 with oil 510V100 | Example 1 with both oils | Comparative Example 2— Example 1 with DC3074 |
|---|---|---|---|---|---|
| Stability after 1 year @ 40° C. in [mPas · s] | 15.7 | 24.1 | 28.2 | 25.9 | 23.7 |
| Static raft performance Mediterranean | 3-10% barnacles and <10% algae | 0% barnacles and <10% algae | 1-3% barnacles and <10% algae | 0% barnacles and <10% algae | 10-20% barnacles and <10% algae |

TABLE 3

Stability results for example 2 (silyl acrylate based) with different oils

| | Comparative Example 3- Example 2 Without silicone oil | Example 7- Example 2 With oil 550 | Example 8- Example 2 with oil 510V100 | Example 2 with both oils | Comparative Example 4- Example 2 with DC3074 |
|---|---|---|---|---|---|
| Stability after 1 year @ 40° C. in [mPas · s] | 24.2 | 21.0 | 26.1 | 19.5 | >100 |

Stability of paint products is measured as viscosity and should not exceed 40 mPas·s at 40° C. after 1 year In addition, drag torque measurements indicated that comparative example 3 without silicone oil had more drag than example 2 with both oils which decreased by 11.5% over time.

Drag Torque Measurements

At 1, 6, 12 and 18 months torque measurements were done on rotating discs.

Torque was measured in Nm

Comparative Example 1

Rosin Based AF
Example 1 was repeated but without silicon oils.

| Raw Material | Example 1 Amount [kg] | Comparative Example 1 Amount [kg] |
|---|---|---|
| Lutonal A25 | 1.40 | 1.3 |
| Rosin | 16.65 | 17.93 |
| Byk 065 | 0.39 | 0.36 |
| Rhodorsil oil 550 | 1.10 | |
| Rhodorsil oil 510V100 | 1.48 | |
| Seanine 211 | 7.38 | 6.85 |
| Bayferrox 222FM | 8.85 | 8.22 |
| Disparlon 6650 | 0.51 | 0.47 |
| ZnO indirect Serena | 23.83 | 25.51 |
| Finntalc M40 | 12.38 | 9.8 |
| Econea 028 | 3.51 | 3.26 |

-continued

| Raw Material | Example 1 Amount [kg] | Comparative Example 1 Amount [kg] |
|---|---|---|
| Bentone SD-2 | 1.15 | 1.07 |
| Xylene | 21.37 | 25.21 |
| Total | 100.00 | 100.00 |

The results of example 1 versus comparative example 1 show a marked improvement in antifouling performance—see table 2 owing to the presence of the silicon oils in example 1.

Example 2 and Comparative Example 3

Silylacrylate Based AF

| Raw Material | Example 2 Amount [kg] | Comparative Example 3 Amount [kg] |
|---|---|---|
| Polyace NSP100 | 20.19 | 21.64 |
| Vestinol AH | 1.77 | 1.70 |
| Seanine 211N | 6.05 | 5.80 |
| Indonesian Rosin | 4.60 | 5.53 |
| Thixatrol ST | 0.97 | 0.92 |
| Sylosiv A4 | 1.26 | 1.21 |
| Bayferrox 222 FM | 4.73 | 4.54 |
| Cuprous oxide, red | 40.52 | 38.83 |
| ZnO direct EMP | 9.51 | 11.42 |
| Finntalc M40 | 1.18 | — |
| xylene | 5.57 | 8.41 |
| Rhodorsil oil 550 | 1.29 | — |
| Rhodorsil oil 510V100 | 2.36 | — |
| Total | 100.00 | 100.0 |

The results of example 2 versus comparative example 3 show a marked improvement in drag torque of 11.5% over time.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An erodible antifouling coating composition comprising:
   an erodible binder system excluding a triorgano tin based binder;
   one or more antifouling agents; and
   1 to 10% solids of a mixture of silicone oils, based on the total solids of the composition,
   wherein the erodible binder system is present in an amount of between 10% to 60% by weight of the solid content of the antifouling coating composition; and
   wherein the mixture of silicone oils comprises at least a first silicone oil and a second silicone oil, wherein the first silicone oil comprises alkyl and aryl organo groups attached to silicon in a first ratio and the second silicone oil comprises alkyl and aryl organo groups attached to silicon in a second ratio, wherein the first ratio and the second ratio are different.

2. The erodible antifouling coating composition according to claim 1,
   wherein the mixture of silicone oils comprises a polyorganosiloxane having a structure comprising diorganosiloxane residues and terminal organosiloxane residues, and, optionally, branched organosiloxane residues;
   wherein the diorganosiloxane residues of the polyorganosiloxane comprise one or more of

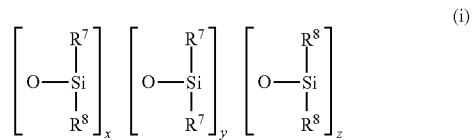

(i)

and;
the terminal organosiloxane residues comprise

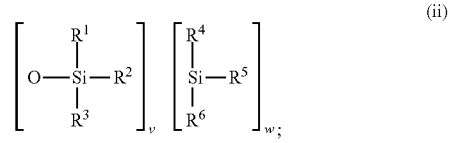

(ii)

whereas the optional branched organosiloxane residues comprise;

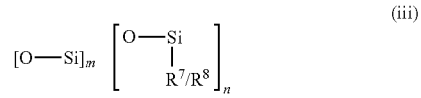

(iii)

wherein $R^1$ to $R^6$ independently comprise an inert organic group;
$R^7$ comprises an inert organic group;
$R^8$ comprises an inert organic group;
$v=n+2m+1$;
$w=1$;
n is 0 to $x+y+z/3$, rounded to the nearest whole number;
m is 0 to $x+y+z/10$, rounded to the nearest whole number;
$x+y+z$ is 5 to 1000, with the proviso that diorganosiloxane residues selected from the structures in (i) above having $R^7$ groups and diorganosiloxane residues selected from the structures in (i) above having $R^8$ groups are present in the polyorganosiloxane.

3. The erodible antifouling coating composition according to claim 2, wherein each of the $R^1$ to $R^6$ groups independently comprise alkyl or aryl groups, $R^7$ comprises an aryl group, and $R^8$ comprises an alkyl group.

4. The erodible antifouling coating composition according to claim 3,
wherein the alkyl groups comprise saturated hydrocarbon radicals being straight or branched, polycyclic, acyclic, cyclic or part cyclic/acyclic moieties or combinations thereof and contain 1 to 10 carbon atoms; and/or
wherein the aryl groups comprise an organic radical derived from an aromatic hydrocarbon by removal of one hydrogen and include any monocyclic, bicyclic or polycyclic carbon ring of up to 7 members in each ring, wherein at least one ring is aromatic, wherein said radical may be optionally substituted with one or more substituents independently comprising alkyl or alkoxy radicals; and/or
wherein the aryl groups comprise phenyl, naphthyl, idenyl and alkyl substituted phenyl.

5. The erodible antifouling coating composition according to claim 2, wherein at least 10% of the total $R^7$ and $R^8$ groups comprise alkyl groups and at least 10% of total $R^7$ and $R^8$ groups comprise aryl groups.

6. The erodible antifouling coating composition according to claim 2, wherein the mixture of silicone oils comprises a methyl phenyl silicone oil in which at least 25% of the diorganosiloxane units are methylphenylsiloxane units and the silicone oil comprises a trimethylsilyl-terminated poly(methylphenylsiloxane).

7. The erodible antifouling coating composition according to claim 1, wherein a total of the organo groups of the first silicone oil comprises 70% to 95% alkyl groups and 5% to 30% aryl groups, and the total of the organo groups of the second silicone oil comprises 50% to 80% alkyl groups and 20% to 50% aryl groups.

8. The erodible antifouling coating composition according to claim 1, wherein the erodible binder system is self-polishing and/or ablative.

9. The erodible antifouling coating composition according to claim 1, wherein the erodible binder system comprises an alkaline soluble binder.

10. The erodible antifouling coating composition according to claim 1, wherein the erosion rate of the dried coating on a substrate in seawater is at least 1 μm per month at 10 knots.

11. The erodible antifouling coating composition according to claim 9, wherein the alkaline soluble binder optionally comprises a rosin based binder, a zinc resinate based binder, a copper resinate based binder, a silyl acrylate based binder or a metal acrylate based binder including copolymers and/or mixtures thereof.

12. The erodible antifouling coating composition according to claim 11, wherein the rosin based binder comprises a resin acid; and/or wherein the silyl acrylate based binder is a binder comprising residues of monomers in accordance with formula I:

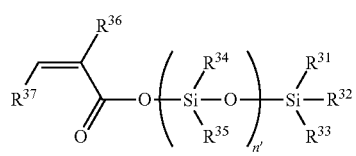

Formula I wherein
$R^{31}$, $R^{32}$, $R^{33}$, $R^{34}$, $R^{35}$ each independently comprise an alkyl, an aryl group or a hydrogen atom,
$R^{36}$ comprises a hydrogen atom or a methyl group,
$R^{37}$ comprises a hydrogen atom or an alkyl group,
n' represents a number of diorganosilxoane units from 0 to 200; and/or
the metal acrylate based binder comprises an acrylic copolymer having at least one side chain bearing a group of the formula II

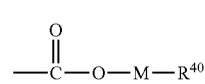

II wherein M comprises Zn, Ca, Mg or Cu, and $R^{40}$ represents an organic acid residue selected from

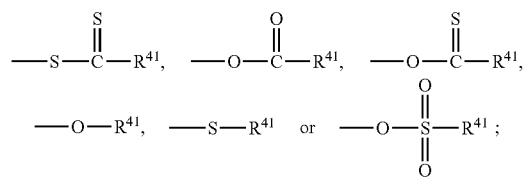

wherein $R^{41}$ is a monovalent organic residue.

13. The erodible antifouling coating composition according to claim 12, wherein
$R^{31}$, $R^{32}$, $R^{33}$, $R^{34}$, $R^{35}$ each independently comprise an alkyl, an aryl group or a hydrogen atom, $R^{36}$ represents a hydrogen atom or a methyl group, and
$R^{37}$ represents a hydrogen atom.

14. The erodible antifouling coating composition according to claim 9, wherein the binder system comprises either a copolymer and/or a co-binder (co)polymer that incorporates acrylic and/or vinyl monomer residues.

15. The erodible antifouling coating composition according to claim 1, wherein the antifouling agent comprises an inorganic compounds, a metal-containing organic compounds, and/or metal-free organic compounds.

16. A substrate at least partially coated with a dried coating composition according to claim 1.

17. A process for producing an erodible antifouling coating composition according to claim 1, wherein the coating composition is prepared by combining the erodible binder system, the one or more antifouling agents, the mixture of silicone oils, and a solvent; and mixing them by a suitable method.

18. A process of coating at least a portion of a substrate with an erodible antifouling coating according to claim 1 by applying the undried antifouling coating composition onto the surface of a leach layer free substrate to be coated and then removing the solvent through evaporation and wherein for a coating process that is over-coating of an old coating then when over-coating with the erodible antifouling coating, the old coating is washed and/or sweep blasted such that whatever leach layer is present, if any, is removed before over-coating with the new over-coating layer.

19. The erodible antifouling coating composition according to claim 1, wherein the first ratio of alkyl:aryl groups is 5:1 to 20:1 and the second ratio of alkyl:aryl groups is 1:1 to 5:1.

20. The erodible antifouling coating composition according to claim 1, wherein the first and second silicone oils are present in the composition at 3 to 8%, based on the total solids weight of the composition.

* * * * *